(12) United States Patent
Song

(10) Patent No.: US 11,772,708 B2
(45) Date of Patent: Oct. 3, 2023

(54) FRONT VEHICLE BODY STRUCTURE

(71) Applicants: Hyundai Motor Company, Seoul (KR); Kia Corporation, Seoul (KR)

(72) Inventor: Won Ki Song, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 248 days.

(21) Appl. No.: 17/340,394

(22) Filed: Jun. 7, 2021

(65) Prior Publication Data

US 2022/0194478 A1 Jun. 23, 2022

(30) Foreign Application Priority Data

Dec. 17, 2020 (KR) .......................... 10-2020-0177100

(51) Int. Cl.

| | |
|---|---|
| *B62D 25/08* | (2006.01) |
| *B62D 21/15* | (2006.01) |
| *B62D 25/20* | (2006.01) |
| *B60K 1/04* | (2019.01) |

(52) U.S. Cl.
CPC ......... *B62D 25/081* (2013.01); *B62D 21/152* (2013.01); *B62D 25/2018* (2013.01); *B60K 1/04* (2013.01)

(58) Field of Classification Search
CPC .. B62D 25/081; B62D 25/08; B62D 25/2018; B62D 31/003; B62D 21/152; B60K 1/04
See application file for complete search history.

(56) References Cited

U.S. PATENT DOCUMENTS

| | | | |
|---|---|---|---|
| 4,217,970 A * | 8/1980 | Chika ................. | B60G 21/055 296/205 |
| 5,882,064 A | 3/1999 | Emmons | |
| 8,939,242 B2 * | 1/2015 | Kurakawa ............... | B60K 1/04 180/65.1 |
| 9,994,260 B2 | 6/2018 | Ito | |
| 2014/0117684 A1 | 5/2014 | Kim | |
| 2018/0029493 A1 * | 2/2018 | Kobayashi .............. | B60K 1/00 |

(Continued)

FOREIGN PATENT DOCUMENTS

| | | |
|---|---|---|
| CN | 105730524 B * | 10/2017 |
| JP | 2005335520 A | 12/2005 |
| JP | 2014091511 A | 5/2014 |

(Continued)

OTHER PUBLICATIONS

European Patent Office, Extended European Search Report issued in Application No. 21183102.9, dated Jan. 27, 2022, total 9 pages.

*Primary Examiner* — Lori Lyjak
(74) *Attorney, Agent, or Firm* — Slater Matsil, LLP

(57) ABSTRACT

An embodiment front vehicle body structure includes an underbody, an upper body coupled to the underbody, a front cowl disposed in front of the upper body, and a cowl support unit connected to the front cowl through a front pillar and a front side member of the upper body. An embodiment cowl support unit includes a cowl lower cross member connected to a front of the front side member along a vehicle width direction, a cowl lower support connected to the cowl lower cross member and the front cowl, and a cowl upper side support connecting an upper portion of the front pillar and the front cowl.

20 Claims, 11 Drawing Sheets

(56) References Cited

U.S. PATENT DOCUMENTS

2020/0324824 A1* 10/2020 Kim .................... B62D 25/025
2020/0324826 A1   10/2020 Heo et al.

FOREIGN PATENT DOCUMENTS

| | | | | |
|---|---|---|---|---|
| JP | 2015071358 | A | | 4/2015 |
| JP | 6030001 | B2 | | 11/2016 |
| JP | 6540846 | B1 * | 7/2019 | ............ B62D 25/00 |
| KR | 19980026507 | U * | 8/1998 | |
| WO | 2020109544 | A1 | | 6/2020 |

* cited by examiner

FRONT VEHICLE BODY STRUCTURE

CROSS-REFERENCE TO RELATED APPLICATIONS

This application claims the benefit of Korean Patent Application No. 10-2020-0177100, filed on Dec. 17, 2020, which application is hereby incorporated herein by reference.

TECHNICAL FIELD

The present invention relates to a vehicle body.

BACKGROUND

Recently, the vehicle industry has introduced a new concept of future mobility vision for realizing a dynamic human-centered future city. One of these future mobility solutions is a PBV (Purpose Built Vehicle) as a purpose-based mobility.

The PBV is an environment-friendly mobility solution that provides customized services necessary for occupants during the time of traveling from the origin to the destination, and it may also perform optimal path predetermination and cluster driving for each situation using electric vehicle-based and artificial intelligence.

For example, the PBV is a box-type design vehicle with a large interior space, and windshield glass is configured at the front of the vehicle body to provide a large interior space.

The vehicle body of this PBV includes an underbody (also referred to as a rolling chassis or skateboard in the industry) and an upper body mounted on the underbody. Here, the battery module is mounted on the underbody. In addition, the upper body may be a space frame formed by welding steel plates or pipes to form a skeleton.

However, such a PBV has a problem that, as the front vehicle body is designed in a box shape, the front frame strength may be weak and the impact absorption performance in the case of a forward collision may be weak.

The above information disclosed in this Background section is only for enhancement of understanding of the background of the invention, and therefore it may contain information that does not form the prior art that is already known to a person of ordinary skill in the art.

SUMMARY

The present invention relates to a vehicle body. Particular embodiments relate to a front vehicle body structure of a PBV (Purpose Built Vehicle).

Embodiments of the present invention provide a front vehicle body structure capable of increasing the skeletal strength at the front side of the vehicle body and increasing front impact performance.

A front vehicle body structure includes an underbody and an upper body coupled to the underbody. The front vehicle body structure according to an exemplary embodiment of the present invention may include a front cowl, which is a front structure of the upper body 20 and is disposed in front of the upper body. The front vehicle body structure may also include a cowl support unit connected to the front cowl through a front pillar and a front side member of the upper body.

The cowl support unit may include a lower load pass, an upper load pass, and a top load pass to transfer the load input from the front to the front pillar.

The cowl support unit may include a cowl lower cross member connected to the front of the front side member along the vehicle width direction, a cowl lower support connected to the cowl lower cross member and the front cowl, and a cowl upper side support connecting an upper portion of the front pillar and the front cowl.

The cowl support unit may further include a cowl lower side support connected to a lower portion of the cowl upper side support and to the front pillar, and a fender apron upper member connected to the cowl lower support and the front pillar.

The front vehicle body structure according to an exemplary embodiment of the present invention may further include a front floor panel mounted on the upper body, a floor upper coupled to the front floor panel, and at least one floor reinforcement frame combined along the front and rear directions on the floor upper.

The cowl support unit may further include a cowl cross bar assembly coupled along the vehicle width direction to the floor reinforcement frame.

The cowl cross bar assembly may include a reinforcement member connected to the fender apron upper member and the front pillar, and a pair of cowl cross bars that is connected to the reinforcement member through both ends.

The cowl cross bar assembly may further include a spacer member engaged with the fender apron upper member and the reinforcement member therebetween.

The cowl cross bar assembly may further include a cowl cross bar extension connected with the floor reinforcement frame and coupled with the pair of cowl cross bars.

The pair of cowl cross bars may include closed cross-sections of different shapes.

The reinforcement member may be connected to the wheel house of the upper body and a body mounting support coupled to the front side member.

At the front end of the front side member, a first mount point may be formed at a position corresponding to the cowl lower cross member and the cowl lower support, and a first engage portion may be installed to the first mount point.

The first engage portion may be engaged in the first mounting portion of the underbody, and the first mounting portion may be provided in a front crash box of a front back beam assembly.

A second mount point may be formed between the front end and the rear end of the front side member at a position corresponding to the body mounting support coupled to the wheel house of the upper body, and the second engage portion may be installed to the second mount point.

The second engage portion may be engaged in the second mounting portion of the underbody, and the second mounting portion may be provided on the front chassis frame at the rear side of the front back beam assembly.

According to an exemplary embodiment of the present invention, it is possible to increase the strength of the front side skeleton of the underbody and the upper body, and improve the front collision performance of the vehicle.

In addition, the effects obtained or predicted by exemplary embodiments of the present invention will be disclosed directly or implicitly in the detailed description of exemplary embodiments of the present invention. That is, various effects predicted according to exemplary embodiments of the present invention will be disclosed within a detailed description to be described later.

BRIEF DESCRIPTION OF THE DRAWINGS

Since these drawings are for reference only to explain exemplary embodiments of the present invention, the technical idea of the present invention should not be interpreted as being limited to the accompanying drawings.

Figure 1:
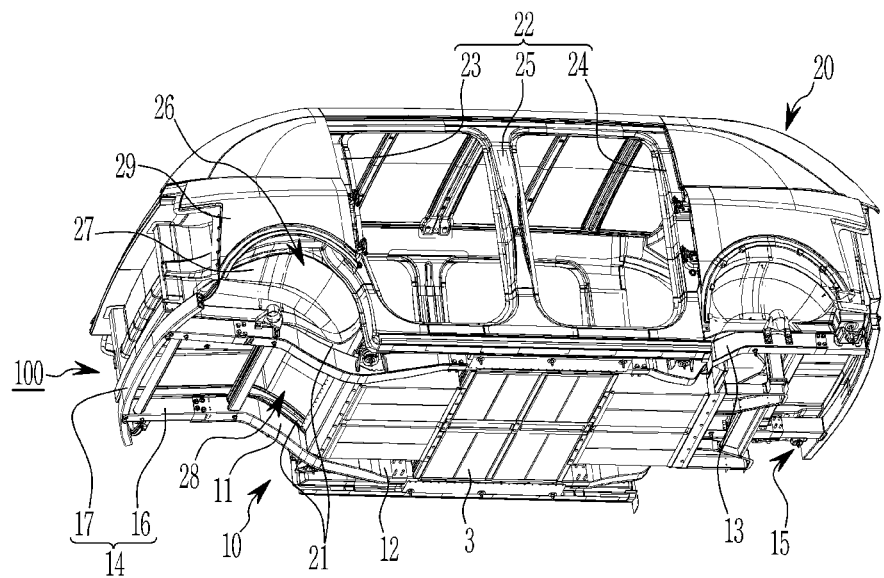
FIG. 1 is a drawing showing a vehicle which may be provided with a front vehicle body structure according to an exemplary embodiment of the present invention.

The following elements may be used in connection with the drawings to describe embodiments of the present invention.

| | |
|---|---|
| 1: vehicle | 3: battery assembly |
| 10: underbody | 11: front chassis frame |
| 12: center chassis frame | 13: rear chassis frame |
| 14: front back beam assembly | 15: rear back beam assembly |
| 16: front crash box | 17: front back beam |
| 20: upper body | 21: front side member |
| 22: side assembly | 23: front pillar |
| 24: rear pillar | 25: center pillar |
| 26: front quarter | 27: wheel house |
| 28: front floor panel | 29: fender panel |
| 30: front cowl | 40: cowl support unit |
| 41: cowl lower cross member | 43: cowl lower support |
| 45: cowl upper side support | 47: cowl lower side support |
| 49: fender apron upper member | 51: floor upper |
| 53: floor reinforcement frame | 61: cowl cross bar assembly |
| 63: reinforcement member | 64: body mounting support |
| 65: spacer member | 66a, 73: bolt |
| 66b: nut | 67: front cowl cross bar |
| 67a, 69a: closed cross-section | 69: rear cowl cross bar |
| 71: cowl cross bar extension | 81: first mount point |
| 83: first engage portion | 85: first mounting bolt |
| 87: first mounting portion | 89: first weld nut |
| 91: second mount point | 93: second engage portion |
| 95: second mounting bolt | 97: second mounting portion |
| 99: second weld nut | 100: front vehicle body structure |
| 101: lower load pass | 103: upper load pass |
| 105: top load pass | |

DETAILED DESCRIPTION OF ILLUSTRATIVE EMBODIMENTS

Hereinafter, embodiments of the present invention will be described in detail with reference to the accompanying drawings so that those of ordinary skill in the art may easily implement the present invention. As those skilled in the art would realize, the described embodiments may be modified in various different ways, all without departing from the spirit or scope of the present invention.

In order to clearly describe embodiments of the present invention, parts irrelevant to the description are omitted, and the same reference numerals are attached to the same or similar components throughout the specification.

Since the sizes and thicknesses of each component shown in the drawings are arbitrarily shown for convenience of description, the present invention is not necessarily limited to those shown in the drawings, and the thicknesses are enlarged to clearly express various parts and regions.

In addition, in the following detailed description, the names of the configurations are divided into first, second, etc. to distinguish the configurations in the same relationship, and are not necessarily limited to the order in the following description.

Throughout the specification, when a part includes a certain component, it means that other components may be further included rather than excluding other components unless specifically stated to the contrary.

In addition, terms such as . . . unit, . . . means, etc. described in the specification mean a unit of a comprehensive structure that performs at least one function or operation.

FIG. 1 is a drawing showing a vehicle which may be provided with a front vehicle body structure according to an exemplary embodiment of the present invention.

Referring to FIG. 1, a front vehicle body structure 100 according to an exemplary embodiment of the present invention may be applied to vehicle 1, for example, a Purpose Built Vehicle (hereinafter referred to as PBV).

The PBV 1 is an electric vehicle-based environment-friendly mobile vehicle that provides the occupants with the customized services they need during their travel time from origin to destination. Furthermore, the PBV 1 may be a box-type design vehicle with a large interior space. The PBV 1 of the box-type design described above has windshield glass (not shown in the drawing) at the front of the vehicle body.

The PBV 1 includes a skateboard type underbody 10 (also referred to as a rolling chassis in the industry) and an upper body 20 mounted on the underbody 10.

A battery assembly 3 is mounted on the underbody 10. The underbody 10 includes a front chassis frame 11, a center chassis frame 12, and a rear chassis frame 13 connected to each other along the front and rear directions of the vehicle body. These front, center and rear chassis frames 11, 12, and 13 include cross members.

A front back beam assembly 14 is connected to the front side of the front chassis frame 11. A rear back beam assembly 15 is connected to the rear side of the rear chassis frame 13.

The front back beam assembly 14 includes a front crash box 16 and a front back beam 17. The front crash box 16 connects the front back beam 17 and the front chassis frame 11.

The upper body 20 is a body that is coupled to the underbody 10, and includes a cabin in the center part between the front and rear parts, for example, it may be a space frame formed by connecting steel plates or pipes.

The upper body 20 includes front side members 21 provided on both sides of the front part, and a side assembly 22 connected to the front side members 21 along the front and rear directions of the vehicle body. These front side members 21 and side assembly 22 are combined with the underbody 10.

Here, the side assembly 22 includes a front pillar 23 disposed at the front of the vehicle, a rear pillar 24 disposed at the rear of the vehicle body, and a center pillar 25 disposed between the front pillar 23 and the rear pillar 24.

And, the side assembly 22 includes front quarters 26 provided on both sides of the front part. In addition, a wheel house 27 is formed in the front quarter 26. A front floor panel 28 is installed between the front quarters 26 on both sides of the upper body 20.

In the industry, the vehicle width direction is called the L direction, the vehicle body length direction (the direction before and after the vehicle body) is called the T direction, and the height direction of the vehicle body is called the H direction. However, in an exemplary embodiment of the present invention, instead of setting the LTH direction as described above as the reference direction, the constituent elements in the following will be described by setting the vehicle width direction, front-rear direction and the up and down (vertical) direction of the vehicle body.

In addition, the end (one/one end or the other/one end) in the following may be defined as either end, and is defined as a certain part (one/one end or the other/one end) including the end.

The front vehicle body structure 100 according to an exemplary embodiment of the present invention is capable of improving the strength of the skeleton at the front side of the vehicle body and improving the absorption performance of the collision load caused by the front collision of the vehicle body.

Figure 2:
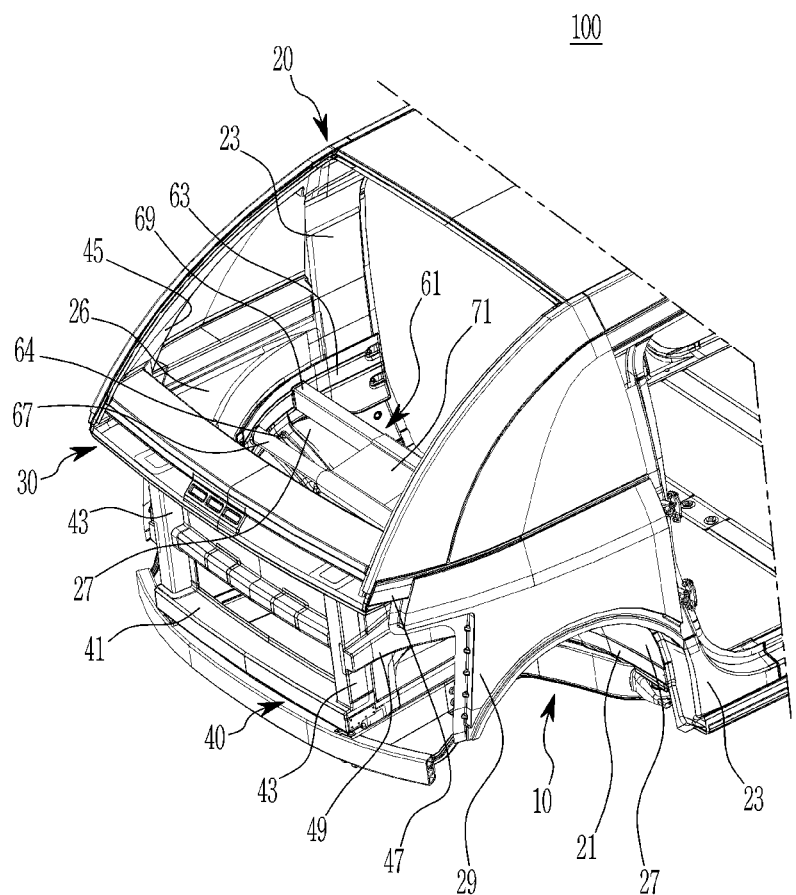
FIG. 2, FIG. 3 and FIG. 4 are drawings showing the front vehicle body structure according to an exemplary embodiment of the present invention.
Figure 3:
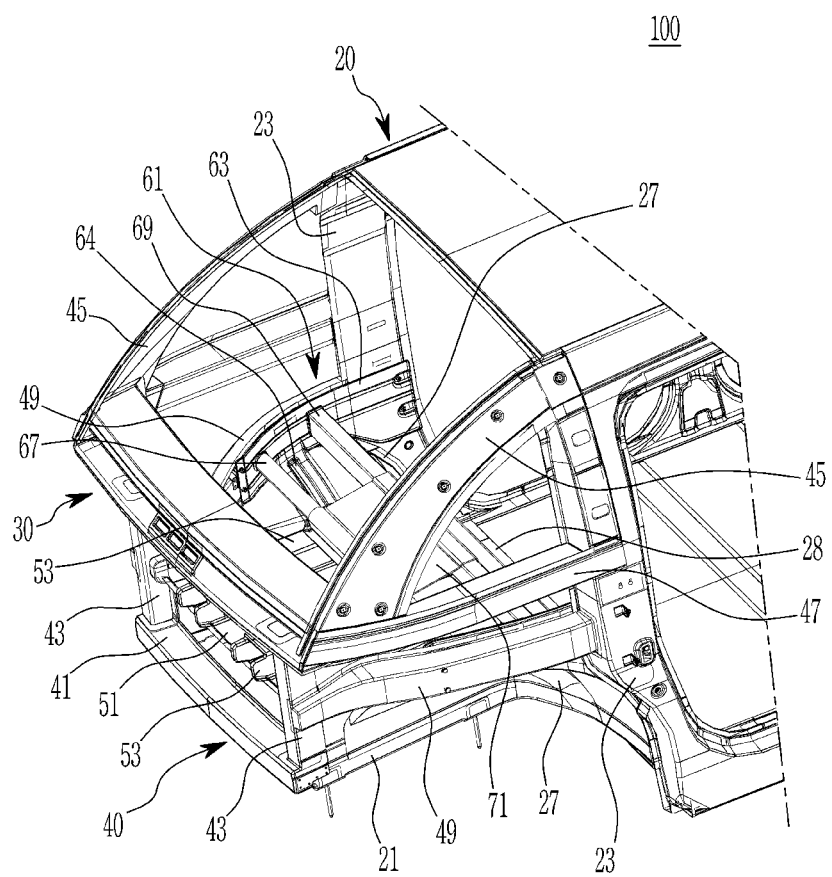
Figure 4:
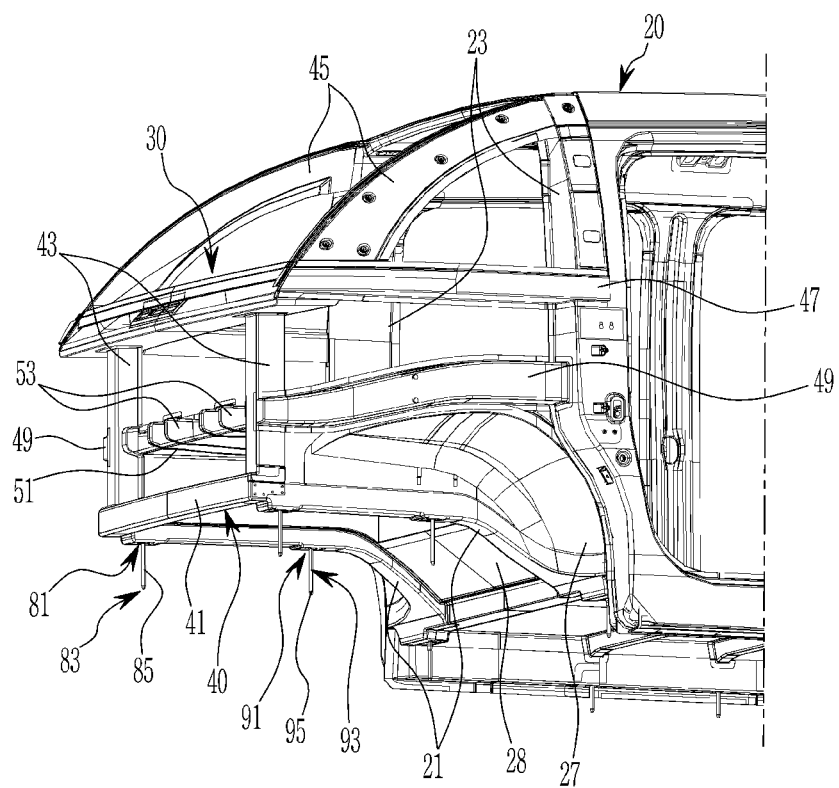
Figure 5:
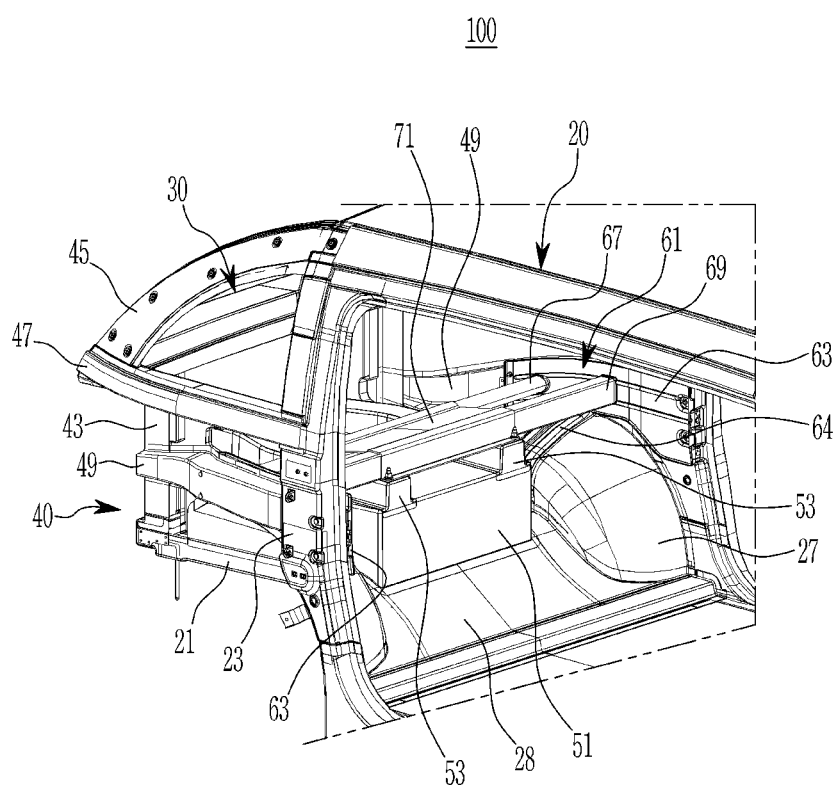
FIG. 5, FIG. 6, FIG. 7A, FIG. 7B and FIG. 8 are drawings showing a cowl crossbar assembly of a cowl support unit applied to the front vehicle body structure according to an exemplary embodiment of the present invention.
Figure 6:
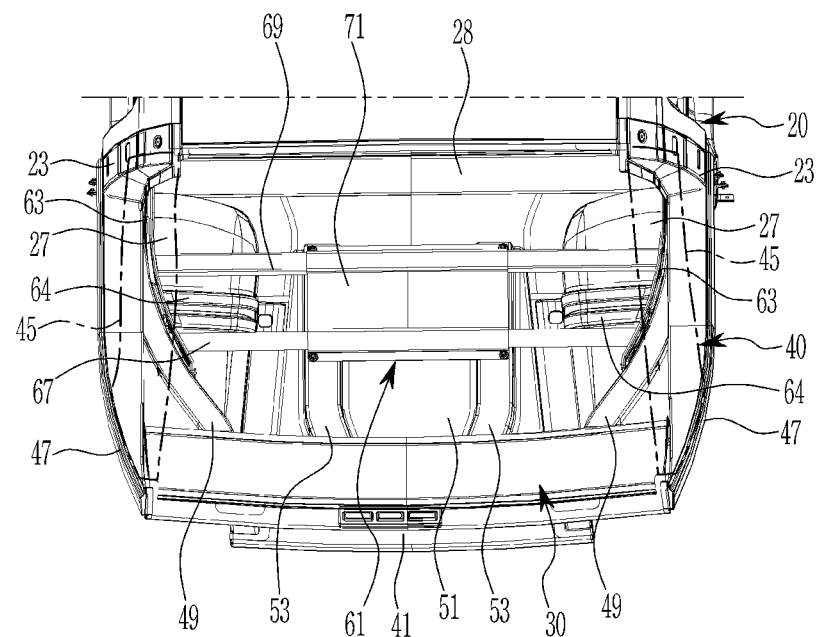

FIG. 2 to FIG. 4 are drawings showing the front vehicle body structure according to an exemplary embodiment of the present invention.

Referring to FIG. 2 to FIG. 4, the front vehicle body structure 100 according to an exemplary embodiment of the present invention includes a front cowl 30 and a cowl support unit 40.

In an embodiment of the present invention, the front cowl 30 is a front structure of the upper body 20 and is disposed at the front of the upper body 20. The front cowl 30 is disposed along the vehicle width direction at the front of the upper body 20.

This front cowl 30 may be connected to the front side members 21 and the front pillar 23 through the cowl support unit 40.

In an exemplary embodiment of the present invention, the cowl support unit 40 supports the front cowl 30, and may improve stiffness of the front cowl 30 and the underbody 10 in the front-rear direction, the vehicle width direction and the vertical direction of the vehicle body.

The cowl support unit 40 is connected to the front cowl 30 through the front side member 21 and the front pillar 23 of the upper body 20.

The cowl support unit 40 includes a cowl lower cross member 41, a cowl lower support 43, a cowl upper side support 45, a cowl lower side support 47, a fender apron upper member 49, and a cowl cross bar assembly 61.

The cowl lower cross member 41 is to improve the vehicle width direction strength of the cowl lower support 43, and is connected to the front of the front side member 21 along the vehicle width direction.

In the above, the cowl lower support 43 is to improve the up and down direction strength of the front cowl 30, and is disposed between the front cowl 30 and the cowl lower cross member 41 in the up and down directions. The cowl lower support 43 may be provided in pairs, but is not limited thereto. The cowl lower support 43 has its lower part connected to the cowl lower cross member 41, and its upper part is connected to the front cowl 30.

The cowl upper side support 45 is for improving the stiffness of the front cowl 30 in the front-rear direction and the vertical direction, and is connected to the upper part of the front pillar 23 and the front cowl 30 in an arch form.

The cowl lower side support 47 is for improving the stiffness of the front cowl 30 in the front-rear direction of the vehicle body, and is connected to the lower portion of the cowl upper side support 45 and the front pillar 23.

The fender apron upper member 49 is equipped with a fender panel 29 on the front side of the upper body 20, and the fender apron upper member 49 increases the rigidity of the cowl lower support 43 in the front-rear direction of the vehicle body. The fender apron upper member 49 is connected to the cowl lower support 43 and the front pillar 23.

FIG. 5 to FIG. 8 are drawings showing a cowl crossbar assembly of a cowl support unit applied to the front vehicle body structure according to an exemplary embodiment of the present invention.

Referring to FIG. 5 to FIG. 8, a floor upper 51 is coupled to the front floor panel 28 in the upper body 20. The floor upper 51 is for mounting the vehicle's steering device (not shown in the drawing), and is connected to the front side member 21.

On the upper surface of the floor upper 51, at least one, for example, a pair, of floor reinforcement frames 53 are coupled to be spaced apart from each other along the vehicle width direction.

In the front floor structure of the upper body 20, the cowl cross bar assembly 61 according to an exemplary embodiment of the present invention is for mounting the steering device on the floor upper 51. The cowl cross bar assembly 61 also functions to improve the front-rear direction and vehicle width direction strength of the fender apron upper member 49.

The cowl cross bar assembly 61 connects the cowl lower support 43, the fender apron upper member 49, and the front pillar 23. The cowl cross bar assembly 61 is attached to the floor reinforcement frame 53 along the vehicle width direction.

This cowl cross bar assembly 61 includes a reinforcement member 63, a spacer member 65, a pair of cowl cross bars 67 and 69, and a cowl cross bar extension 71.

The reinforcement member 63 is to reinforce the rigidity and the strength of the cowl cross bars 67 and 69. The reinforcement member 63 has a panel shape and is connected to the fender apron upper member 49 and the front pillar 23.

The reinforcement member 63 shares the cross-section of the fender apron upper member 49 and the front pillar 23, and also functions to improve the strength/rigidity against forward impact and endurance loads.

The reinforcement member 63 is connected to the wheel house 27 of the upper body 20 and a body mounting support 64 connected to the front side member 21. One side of the body mounting support 64 is attached to the reinforcement member 63, and the other side is attached to the front side member 21 through the front floor panel 28.

The spacer member 65 is provided between the fender apron upper member 49 and the reinforcement member 63 in order to reinforce their strength. The spacer member 65 is connected with the fender apron upper member 49 and the reinforcement member 63.

Figure 7A:
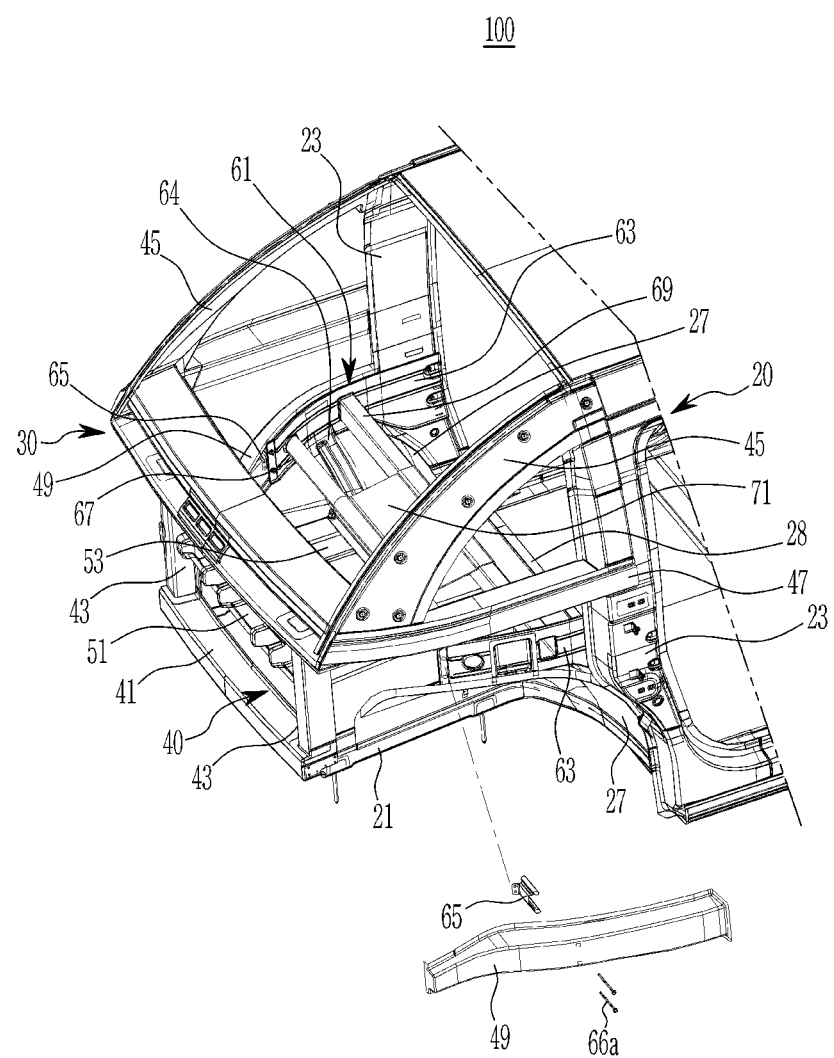
Figure 7B:
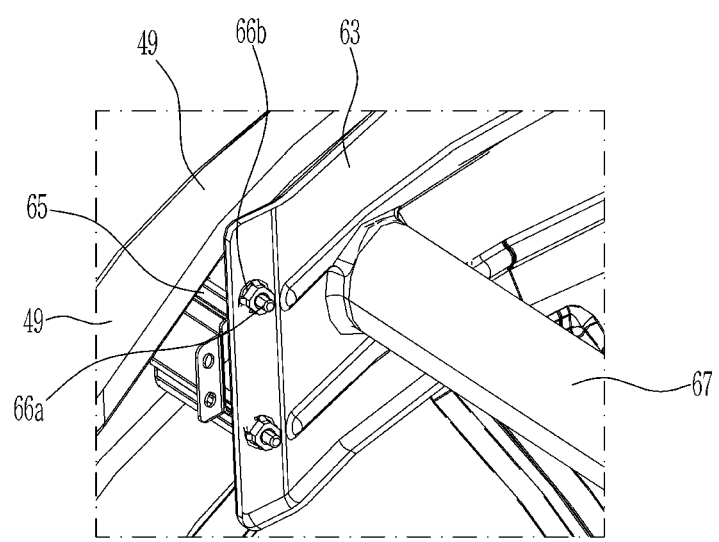
Figure 8:
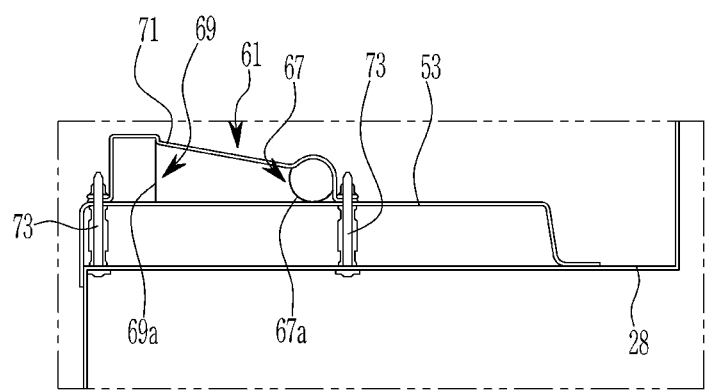

FIG. 7B is an enlarged view of the connection configuration of the spacer member 65 of FIG. 7A. Referring to FIG. 7B, the spacer member 65 engages with the fender apron upper member 49 and the reinforcement member 63 through a bolt 66a and a nut 66b. This spacer member 65 may be provided as a bracket having a pipe shape into which a pair of bolts 66a may be fitted.

The pair of cowl cross bars 67 and 69 may be dual cowl cross bars on which the steering device may be seated. The pair of cowl cross bars 67 and 69 are disposed along the vehicle width direction on the floor reinforcement frame 53, and are coupled to the reinforcement member 63. Both ends of the cowl cross bars 67 and 69 penetrate reinforcement member 63 and may be welded to the reinforcement member 63.

The pair of cowl cross bars 67 and 69 are disposed to be spaced apart from each other along the front-rear direction of the vehicle body. Hereinafter, the cowl cross bar positioned in the front is referred to as a front cowl cross bar 67, and the cowl cross bar positioned at the rear is referred to as a rear cowl cross bar 69.

The front and rear cowl cross bars 67 and 69 are provided in the form of pipes with closed cross-sections of different shapes. For example, the front cowl cross bar 67 may be formed as a circular closed cross-section 67a. In addition, the rear cowl cross bar 69 may be formed as a quadrangle closed cross-section 69a.

The cowl cross bar extension 71 is for integrating the front and rear cowl cross bars 67 and 69 through the floor reinforcement frame 53. The cowl cross bar extension 71 engages the floor reinforcement frame 53 with the front floor panel 28 via a bolt 73. And, the cowl cross bar extension 71 is welded to the front and rear cowl cross bars 67 and 69.

Figure 9:
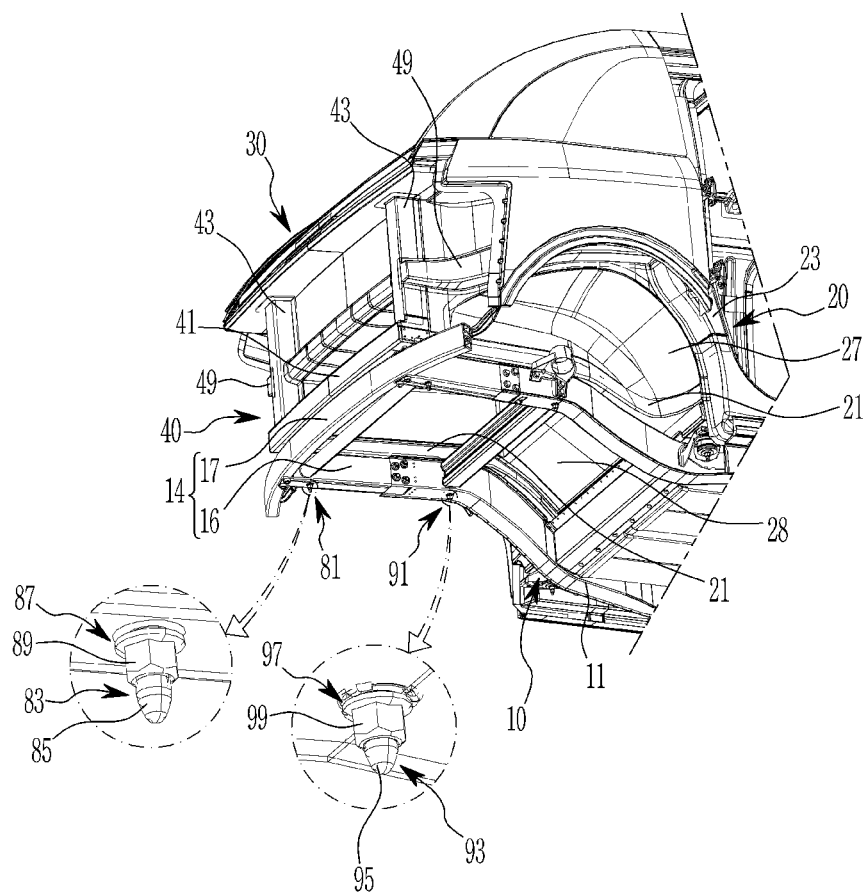
FIG. 9 is a drawing showing a mounting portion of the front vehicle body structure according to an exemplary embodiment of the present invention.

FIG. 9 is a drawing showing a mounting portion of the front vehicle body structure according to an exemplary embodiment of the present invention.

Referring to FIG. 4 and FIG. 9, in an exemplary embodiment of the present invention, a first mount point 81 is formed in a portion connected to the cowl lower cross member 41 and the cowl lower support 43 in the front of the front side member 21.

The first engage portion 83 is installed at the first mount point 81. The first engage portion 83 includes, for example, a first mounting bolt 85 that is fitted in the up and down directions to the first mount point 81 and fixed through a mounting bracket.

This first engage portion 83 is engaged with the first mounting portion 87 of the underbody 10. The first mounting portion 87 is mounted in the front crash box 16 of the front back beam assembly 14 mentioned above. The first mounting portion 87 includes, for example, a first weld nut 89 engaged with the first mounting bolt 85.

In addition, in an exemplary embodiment of the present invention, between the front and rear of the front side member 21, a second mount point 91 connected to the body mounting support 64 (see FIG. 4 to FIG. 6 and FIG. 9) is formed.

The second engage portion 93 is installed at the second mount point 91. The second engage portion 93 includes, for example, a second mounting bolt 95 that is fitted in the up and down directions to the second mount point 91 and fixed through a mounting bracket.

This second engage portion 93 is engaged with the second mounting portion 97 of the underbody 10. The second mounting portion 97 is provided on the front chassis frame 11 on the rear side of the front back beam assembly 14. The second mounting portion 97 includes, for example, a second weld nut 99 engaged with the second mounting bolt 95.

Hereinafter, the effects of the front vehicle body structure 100 according to an exemplary embodiment of the present invention configured as described above will be described in detail with reference to the description and accompanying drawings disclosed above.

The front vehicle body structure 100 according to an exemplary embodiment of the present invention includes the cowl support unit 40 for supporting the front cowl 30 positioned at the front of the upper body 20.

The cowl support unit 40 is connected to the front cowl 30 through the front side member 21 and the front pillar 23 of the upper body 20 and supports the front structure of the front cowl 30.

The cowl support unit 40 includes the cowl lower cross member 41, the cowl lower support 43, the cowl upper side support 45, the cowl lower side support 47, the fender apron upper member 49, and the cowl cross bar assembly 61.

Figure 10:
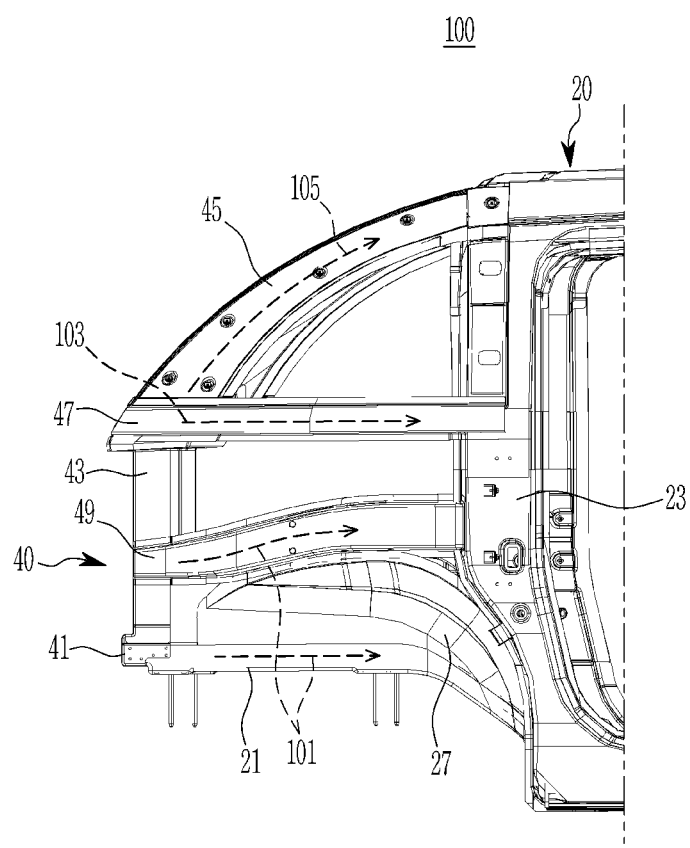
FIG. 10 is a drawing for explaining an effect of the front vehicle body structure according to an exemplary embodiment of the present invention.

FIG. 10 is a drawing for explaining an effect of the front vehicle body structure according to an exemplary embodiment of the present invention.

Referring to FIG. 10, specifically explaining the action of the cowl support unit 40, in an exemplary embodiment of the present invention, the road load may be transmitted to the front side member 21, and a lower load pass 101 is formed, through which the road load is transferred to the front pillar 23 through the fender apron upper member 49.

Referring to FIG. 5 to FIG. 10, the load input to the floor reinforcement frame 53 is transferred to the front pillar 23 through the cowl cross bar assembly 61 and the cowl lower side support 47, forming an upper load pass 103.

Also, referring to FIG. 10, a top load pass 105 is formed in which the load input to the cowl lower cross member 41 and the cowl lower support 43 is transferred to the front pillar 23 through the cowl upper side support 45.

Therefore, in an exemplary embodiment of the present invention, strength of the vehicle body in the front-rear direction, the vehicle width direction and the up and down direction between the front cowl 30, the cowl support unit 40, and the underbody 10 may be improved and torsional strength may be also improved.

Meanwhile, in an exemplary embodiment of the present invention, the first mount point 81 connected to the cowl lower cross member 41 and the cowl lower support 43 is formed on the front side member 21. And, in an exemplary embodiment of the present invention, the first mounting portion 87 engaged with the first mount point 81 is formed in the front crash box 16 in the front back beam assembly 14 of the underbody 10.

Furthermore, in an exemplary embodiment of the present invention, the body mounting support 64 connected to the wheel house 27, and the second mount point 91 connected to the fender apron upper member 49 and the cowl cross bar assembly 61 are provided to the front side member 21. In addition, in an exemplary embodiment of the present invention, the second mounting portion 97, in which the second mount point 91 is engaged, is formed on the front chassis frame 11 of the underbody 10.

Accordingly, in an exemplary embodiment of the present invention, the connection strength of the first mounting portion 87 to which the first mount point 81 is coupled may be less than the connection strength of the second mounting portion 97 to which the second mount point 91 is coupled.

Therefore, in an exemplary embodiment of the present invention, when the vehicle is in a frontal collision, deformation occurs first in the first mounting portion 87 due to a collision load, and deformation may not occur in the second mounting portion 97.

Accordingly, in an exemplary embodiment of the present invention, the front impact performance of the vehicle can be improved by absorbing and distributing the impact load due to the front impact of the vehicle through the first and second mounting portions 87 and 97.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A front vehicle body structure comprising:
an underbody;
an upper body that includes a front cowl, the upper body coupled to the underbody;
a cowl support unit connected to the front cowl through a front pillar and a front side member of the upper body;
a second mount point is formed between a front end and a rear end of the front side member at a position corresponding to a body mounting support coupled to a wheel house of the upper body; and
a second engage portion installed to the second mount point.

2. The front vehicle body structure of claim 1, wherein the cowl support unit includes a lower load pass, an upper load pass, and a top load pass configured to transfer a load input from the front cowl to the front pillar.

3. The front vehicle body structure of claim 1, wherein:
the second engage portion is engaged in a second mounting portion of the underbody; and
the second mounting portion is provided on a front chassis frame at a rear side of a front back beam assembly.

4. A front vehicle body structure comprising:
an underbody;
an upper body that includes a front cowl, the upper body coupled to the underbody; and
a cowl support unit connected to the front cowl through a front pillar and a front side member of the upper body, wherein the cowl support unit comprises:
a cowl lower cross member connected to a front of the front side member along a vehicle width direction;
a cowl lower support connected to the cowl lower cross member and the front cowl;
a cowl upper side support connecting an upper portion of the front pillar and the front cowl;
a cowl lower side support connected to a lower portion of the cowl upper side support and to the front pillar; and
a fender apron upper member connected to the cowl lower support and the front pillar.

5. The front vehicle body structure of claim 4, further comprising:
a front floor panel mounted on the upper body;
a floor upper coupled to the front floor panel; and
a floor reinforcement frame disposed along a front-rear direction on the floor upper.

6. The front vehicle body structure of claim 5, wherein the cowl support unit further comprises a cowl cross bar assembly coupled to the floor reinforcement frame along the vehicle width direction.

7. The front vehicle body structure of claim 6, wherein the cowl cross bar assembly comprises:
a reinforcement member connected to the fender apron upper member and the front pillar; and
a pair of cowl cross bars connected to the reinforcement member at both ends.

8. The front vehicle body structure of claim 7, wherein the cowl cross bar assembly further comprises a spacer member engaged with the fender apron upper member with the reinforcement member therebetween.

9. The front vehicle body structure of claim 7, wherein the cowl cross bar assembly further comprises a cowl cross bar extension connected with the floor reinforcement frame and coupled with the pair of cowl cross bars.

10. The front vehicle body structure of claim 7, wherein the pair of cowl cross bars include closed cross-sections of different shapes.

11. The front vehicle body structure of claim 7, wherein the reinforcement member is connected to a wheel house of the upper body and a body mounting support coupled to the front side member.

12. A front vehicle body structure comprising:
an underbody;
an upper body that includes a front cowl, the upper body coupled to the underbody;
a cowl support unit connected to the front cowl through a front pillar and a front side member of the upper body, wherein the cowl support unit comprises:
a cowl lower cross member connected to a front of the front side member along a vehicle width direction;
a cowl lower support connected to the cowl lower cross member and the front cowl; and
a cowl upper side support connecting an upper portion of the front pillar and the front cowl;
a first mount point formed at the front of the front side member at a position corresponding to the cowl lower cross member and the cowl lower support; and
a first engage portion installed to the first mount point.

13. The front vehicle body structure of claim 12, wherein:
the first engage portion is engaged in a first mounting portion of the underbody; and
the first mounting portion is provided in a front crash box of a front back beam assembly.

14. The front vehicle body structure of claim 12, wherein:
a second mount point is formed between a front end and a rear end of the front side member at a position corresponding to a body mounting support coupled to a wheel house of the upper body; and
a second engage portion is installed to the second mount point.

15. The front vehicle body structure of claim 14, wherein:
the second engage portion is engaged in a second mounting portion of the underbody; and
the second mounting portion is provided on a front chassis frame at a rear side of a front back beam assembly.

16. A vehicle body comprising:
an underbody including a front chassis frame, a center chassis frame, and a rear chassis frame connected to each other along a front-rear direction of the vehicle body;
a battery assembly mounted on the underbody;
an upper body that includes a front cowl, the upper body coupled to the underbody;
a front floor panel mounted on the upper body;
a floor upper coupled to the front floor panel;
a floor reinforcement frame disposed on the floor upper along the front-rear direction; and
a cowl support unit connected to the front cowl through a front pillar and a front side member of the upper body, wherein the cowl support unit comprises:
a cowl lower cross member connected to a front of the front side member along a vehicle width direction;
a cowl lower support connected to the cowl lower cross member and the front cowl;
a cowl upper side support connecting an upper portion of the front pillar and the front cowl;
a cowl lower side support connected to a lower portion of the cowl upper side support and to the front pillar;
a fender apron upper member connected to the cowl lower support and the front pillar; and
a cowl cross bar assembly coupled to the floor reinforcement frame along the vehicle width direction.

17. The vehicle body of claim 16, wherein the cowl cross bar assembly comprises:
- a reinforcement member connected to the fender apron upper member and the front pillar;
- a pair of cowl cross bars connected to the reinforcement member at both ends;
- a spacer member engaged with the fender apron upper member with the reinforcement member therebetween; and
- a cowl cross bar extension connected with the floor reinforcement frame and coupled with the pair of cowl cross bars.

18. The vehicle body of claim 17, wherein the reinforcement member is connected to a wheel house of the upper body and a body mounting support coupled to the front side member.

19. The front vehicle body structure of claim 12, wherein the cowl support unit further comprises:
- a cowl lower side support connected to a lower portion of the cowl upper side support and to the front pillar; and
- a fender apron upper member connected to the cowl lower support and the front pillar.

20. The front vehicle body structure of claim 19, further comprising:
- a front floor panel mounted on the upper body;
- a floor upper coupled to the front floor panel; and
- a floor reinforcement frame disposed along a front-rear direction on the floor upper.

* * * * *